US008133607B1

(12) United States Patent
Chen et al.

(10) Patent No.: US 8,133,607 B1
(45) Date of Patent: Mar. 13, 2012

(54) PARALLEL CONNECTION ASSEMBLY OF BATTERIES AND BATTERY SET HAVING THE SAME

(75) Inventors: Chin-Ming Chen, Gueishan Township, Taoyuan County (TW); Shen-Fa Hsu, Gueishan Township, Taoyuan County (TW)

(73) Assignee: Amita Technologies Inc Ltd., Taoyuan County (TW)

( * ) Notice: Subject to any disclaimer, the term of this patent is extended or adjusted under 35 U.S.C. 154(b) by 0 days.

(21) Appl. No.: 12/959,488

(22) Filed: Dec. 3, 2010

(51) Int. Cl.
*H01M 2/24* (2006.01)

(52) U.S. Cl. .......... 429/158; 429/99; 429/160; 429/161; 429/170; 429/172; 320/112; 439/883

(58) Field of Classification Search .............. 429/82, 429/99, 158, 161, 160, 175, 176, 178, 170, 429/172; 320/112; 439/883
See application file for complete search history.

(56) References Cited

U.S. PATENT DOCUMENTS

| | | | |
|---|---|---|---|
| 6,398,595 B2* | 6/2002 | Wakata et al. | 439/755 |
| 7,270,576 B2* | 9/2007 | Kim et al. | 439/627 |
| 2007/0026306 A1* | 2/2007 | Lee et al. | 429/160 |
| 2008/0063932 A1* | 3/2008 | Ishizu et al. | 429/129 |
| 2008/0160395 A1* | 7/2008 | Okada et al. | 429/99 |
| 2009/0111007 A1* | 4/2009 | Naganuma | 429/82 |

OTHER PUBLICATIONS

JP,09-092259,A(1997), machine translation.*

* cited by examiner

*Primary Examiner* — Patrick Ryan
*Assistant Examiner* — Alex Usyatinsky
(74) *Attorney, Agent, or Firm* — Chun-Ming Shih; HDLS IPR Services

(57) ABSTRACT

A parallel connection assembly of batteries and a battery set having the same are provided. The parallel connection assembly connects battery units to form a battery set, and it includes electrical-conductive connecting pieces, two flexible metallic woven bands and electrical-conductive fixing elements. Each battery unit has a positive electrode hole and a negative electrode hole. Each electrical-conductive connecting piece has a through-hole and a fixing portion. Each electrical-conductive fixing element passes through the through-hole to be fixed in the positive electrode hole or the negative electrode hole. The two flexible metallic woven bands serially connect the fixing portions of the electrical-conductive connecting pieces located on the positive electrode holes and the negative electrode holes respectively, thereby electrically connecting the battery units in parallel. Since the flexible metallic woven band is low in impedance, flexible and easy to assemble, the battery set has an increased electrical-conducting efficiency and resistance to vibrations.

7 Claims, 5 Drawing Sheets

PARALLEL CONNECTION ASSEMBLY OF BATTERIES AND BATTERY SET HAVING THE SAME

BACKGROUND OF THE INVENTION

1. Field of the Invention

The present invention relates to a battery, in particular to a parallel connection assembly of batteries and a battery set having the same.

2. Description of Prior Art

With the rapid advancement of science and technology, more and more mobile electronic devices are developed. Such a mobile electronic device is equipped with at least one battery for supplying necessary electricity. Thus, the manufacturers of the mobile electronic devices try to develop a high-capacity and long-acting battery.

For example, a small-sized electronic device such as a mobile phone is equipped with only one battery, so that the capacity and acting period of the battery can be estimated easily. As for a large-sized electronic device such as a laptop computer or electric vehicle, it is equipped with a high-capacity battery set for outputting large electric current. The battery set comprises a plurality of battery units in parallel connection or serial connection.

Conventionally, screws are used for fastening a plurality of metallic connecting pieces to positive electrode plates and negative electrode plates of the batteries, thereby achieving a parallel connection and/or a serial connection of the batteries. However, since the electrical paths between the metallic connecting pieces and the positive electrode plates or the negative electrode plates are not continuous, the impedance of the whole battery set is large. As a result, the increased impedance reduces the output voltage and current of the batteries. Further, if one of the surfaces of the screws, the metallic connecting pieces, the positive electrode plates or the negative electrode plates is oxidized or rusted due to high temperature or moistures, the impedance of the whole battery set will increase greatly.

One the other hand, since the metallic connecting piece has a lower flexibility, the metallic connecting piece, the positive electrode plate and the negative electrode plate should be dimensionally matched with each other more accurately. Otherwise, these three components cannot be assembled with each other easily. Further, due to poor flexibility of the metallic connecting piece, the metallic connecting piece has low resistance to vibrations if the whole battery set is subjected to external vibrations. Even, the connection between respective battery units may be loosened.

Therefore, it is an important issue for the present Inventor to solve the above-mentioned problems.

SUMMARY OF THE INVENTION

The present invention is to provide a parallel connection assembly of batteries, which has a low impedance, better flexibility, and good resistance to vibration. Further, the present invention can be assembled easily.

The present invention provides a parallel connection assembly of batteries, configured to connect a plurality of battery units in parallel to form a battery set, each of the battery units having a positive electrode hole and a negative electrode hole, the parallel connection assembly including:

a plurality of electrical-conductive connecting pieces each having a through-hole and a fixing portion, the electrical-conductive connecting pieces being aligned with the positive electrode holes and the negative electrode holes respectively;

two flexible metallic woven bands serially connecting the fixing portions of the electrical-conductive connecting pieces located on the positive electrode holes and the negative electrode holes respectively; and a plurality of electrical-conductive fixing elements passing through the through-holes to be fixed in the positive electrode holes and the negative electrode holes, so that the two flexible metallic woven bands can electrically connect the battery units in parallel.

The present invention is to provide a battery set, which has a low impedance, better flexibility, and good resistance to vibration. Further, the battery set of the present invention can be assembled easily.

The present invention provides a battery set, including:

a plurality of battery units each having a positive electrode hole and a negative electrode hole, and a parallel connection assembly, comprising:

a plurality of electrical-conductive connecting pieces each having a through-hole and a fixing portion, the electrical-conductive connecting pieces being aligned with the positive electrode holes and the negative electrode holes respectively;

two flexible metallic woven bands serially connecting the fixing portions of the electrical-conductive connecting pieces located on the positive electrode holes and the negative electrode holes respectively; and a plurality of electrical-conductive fixing elements passing through the through-holes to be fixed in the positive electrode holes and the negative electrode holes, so that the two flexible metallic woven bands can electrically connect the battery units in parallel.

In comparison with prior art, the present invention has advantageous features as follows.

According to the present invention, the flexible metallic woven bands are used to serially connect the positive electrodes and the negative electrodes of the battery units respectively. Thus, the electrical path among these battery units is continuous. Further, the flexible metallic woven band is made by weaving a plurality of copper wires into a web-like structure, so that the surfaces of the flexible metallic woven band may not be oxidized or rusted due to high temperature or moistures. As a result, the impedance of the whole battery set is relatively low, which increases the electrical conductivity thereof. Therefore, with the flexible metallic woven bands serially connecting the battery units, these battery units can be connected in parallel, and a low impedance and high electrical conductivity of the battery set can be achieved.

Further, due to good flexibility of the flexible metallic woven band, the dimensional and positional tolerance between the positive electrode holes and the negative electrode holes of adjacent two battery units may be larger, so that the battery set of the present invention can be assembled easily. Moreover, the flexible metallic woven band can be arbitrarily bent to meet the actual mounting conditions, so that the battery set can be configured in a changeable and adaptive manner.

Further, due to good flexibility of the flexible metallic woven band, the battery set of the present invention has a good resistance to vibration. Even the battery units in the battery set are subjected to external vibrations, the flexible metallic woven band can absorb the vibrations and eliminate the shifting or loosening occurred among the battery units due to the external vibrations.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
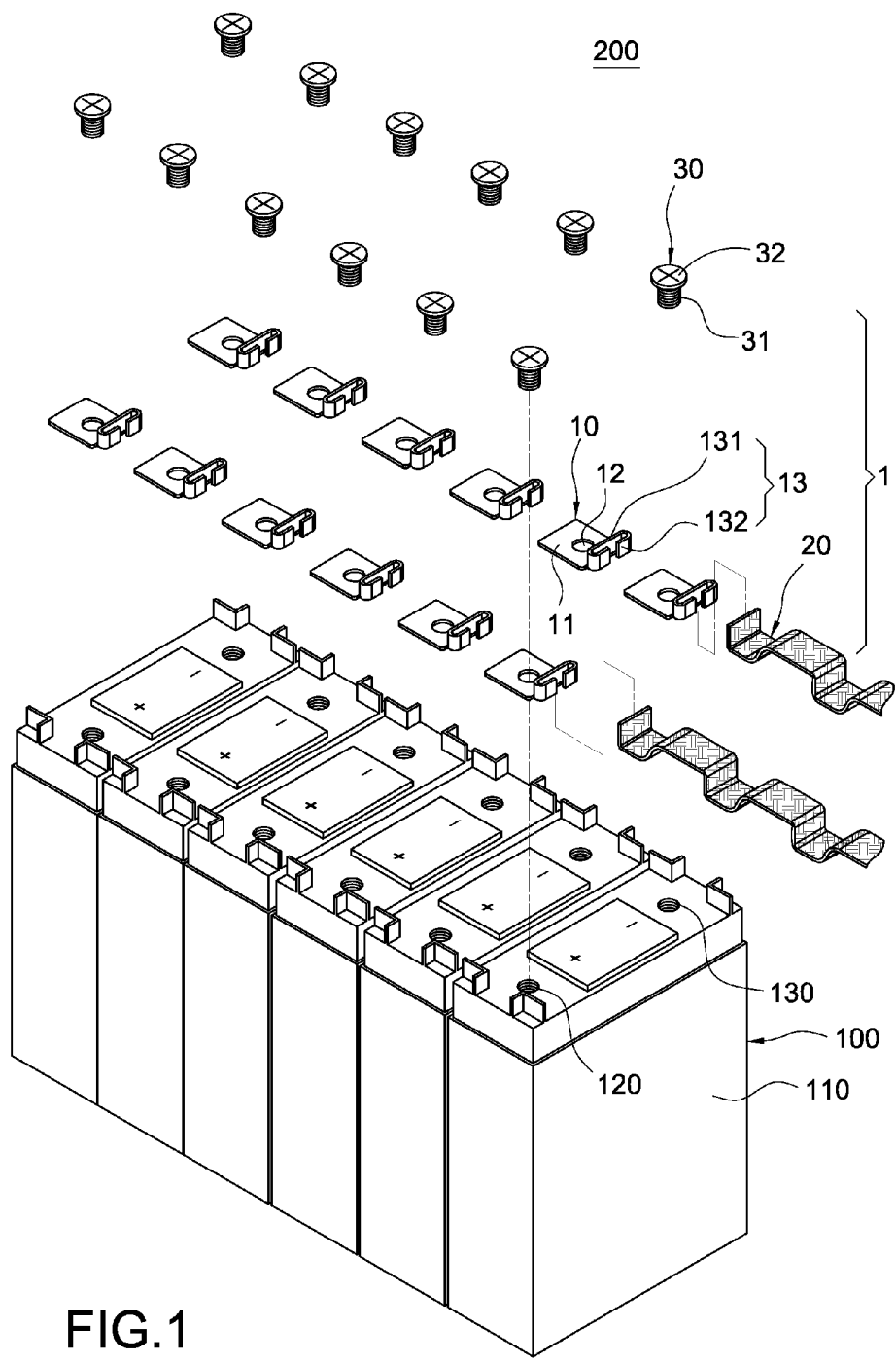
FIG. 1 is an exploded perspective view of one row of battery units according to the present invention.

Please refer to FIG. 1, which is an exploded perspective view of the present invention. The present invention provides a parallel connection assembly of batteries (referred to as "parallel connection assembly 1") for connecting a plurality of battery units 100 in parallel to form a battery set 200. Each of the battery units 100 includes a casing 110. The interior of the casing 110 is provided with a plurality of battery cores (not shown) that are superposed or juxtaposed to each other. The top surface of the casing 110 of the battery unit 100 is provided with a positive electrode hole 120 and a negative electrode hole 130. In the present embodiment, each of the positive electrode hole 120 and the negative electrode hole 130 is a screw hole made of electrical-conductive metal.

The parallel connection assembly 1 of the present invention includes: a plurality of electrical-conduct connecting pieces 10, two flexible metallic woven bands 20, and a plurality of electrical-conductive fixing element 30.

Each of the electrical-conductive connecting pieces 10 is made of electrical-conductive metal and comprises a piece body 11, a through-hole 12 formed in the piece body 11, and a fixing portion 13 extending upwards from one side of the piece body 11. As shown in FIG. 1, in the present embodiment, the fixing portion 13 comprises a stopping wall 131 extending upwards from the piece body 11, and two pressing strips 132 bending from both sides of the stopping wall 131 to face to each other. The flexible metallic woven band 20 passes through a space between the stopping wall 131 and the two pressing strips 132 and is clamped by the two pressing strips 132. The electrical-conductive connecting pieces 10 are disposed on the top surface of the casing 110 of the battery units 100 in such a manner that the through-holes 12 are aligned with the positive electrode holes 120 and the negative electrode holes 130 respectively.

Figure 2:
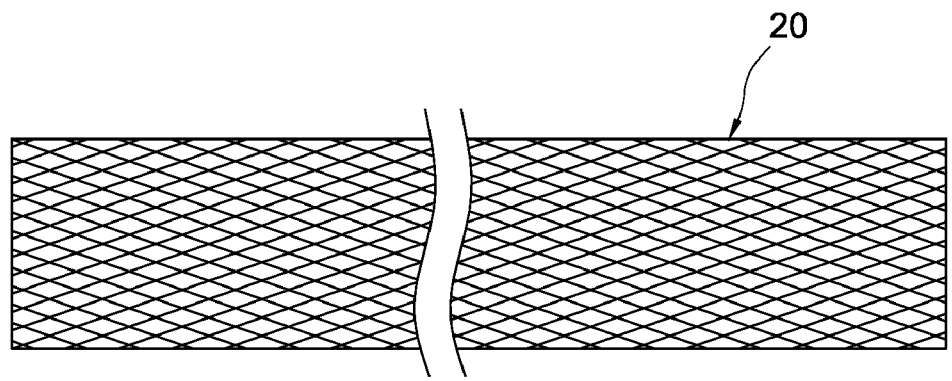
FIG. 2 is a schematic view showing the flexible metallic woven band of the present invention.
Figure 3:
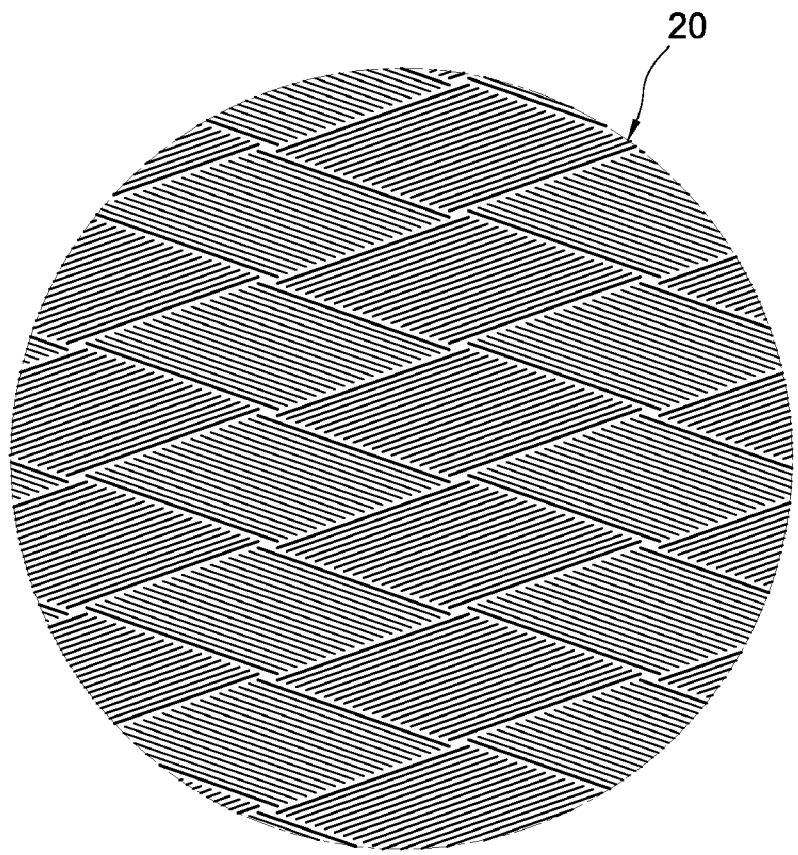
FIG. 3 is a partially enlarged view showing the flexible metallic woven band of the present invention.

The flexible metallic woven band 20 serially connects the fixing portions 13 of the electrical-conductive connecting pieces 10 located on the positive electrode holes 120 and the negative electrode holes 130. More specifically, as shown in FIG. 1, the flexible metallic woven band 20 is bent into a wave shape so as to pass through the fixing portions 13 of the electrical-conductive connecting pieces 10 to serially connect these electrical-conductive connecting pieces 10. Please refer to FIGS. 2 and 3. The flexible metallic woven band 20 is made by weaving a plurality of copper wires into a web-like structure. The surfaces of the flexible metallic woven band 20 are not oxidized or rusted easily due to high temperature or moistures, so that the impedance of the whole battery set is relatively low and the electrical conductivity thereof is increased.

Please refer to FIG. 1 again. Each of the electrical-conductive fixing elements 30 is made of electrical-conductive metal and passes through the through-holes 12 to be fixed into the positive electrode holes 120 or the negative electrode holes 130. More specifically, each of the electrical-conductive fixing elements 30 comprises an outer threaded portion 31 threadedly engaged within the positive electrode hole 120 or the negative electrode hole 130, and a top plate 32 connected to the outer threaded portion 31. The top plate 32 is formed into a circular shape and has a larger diameter than that of the outer threaded portion 31. When the outer threaded portion 31 of the electrical-conductive fixing element 30 passes through the through-hole 12 of the electrical-conductive connecting piece 10 to be threadedly engaged within the positive electrode hole 120 or the negative electrode hole 130, the top plate 32 of the electrical-conductive fixing element 30 tightly abuts against the piece body 11 of the electrical-conductive metallic piece 10 to achieve an electrical connection.

Figure 4:
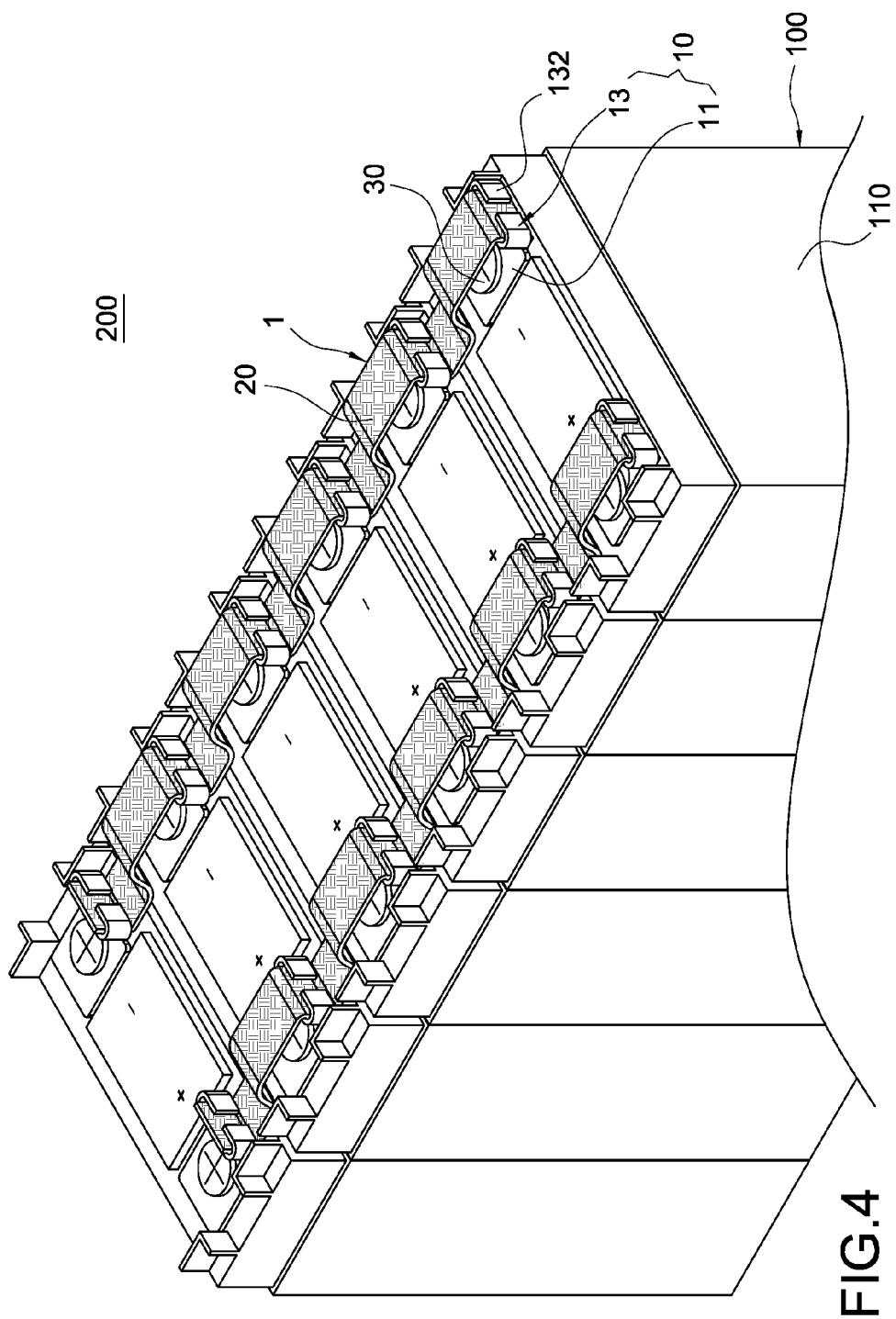
FIG. 4 is an assembled perspective view showing a battery set of the present invention constituted of one row of battery units.

Please refer to FIG. 4, which shows a battery set 200 constituted of one row of battery units 100. The electricity of the battery cores within each battery unit 100 is transmitted from the positive electrode hole 120 to the outer threaded portion 31 (not shown) of the electrical-conductive fixing element 30. Then, the electricity is transmitted from the top plate 32 of the electrical-conductive fixing element 30 to the piece body 11 of the electrical-conductive connecting piece 10. Finally, the electricity is transmitted from the fixing portion 13 of the electrical-conductive connecting piece 10 to the flexible metallic woven band 20. Similarly, the electricity is transmitted through the flexible metallic woven band 20, the electrical-conductive connecting piece 10, and the electrical-conductive fixing element 30 to the negative electrode hole 130. By this arrangement, the two flexible metallic woven bands 20 can connect these battery units 100 in parallel to form a battery set 200.

Figure 5:
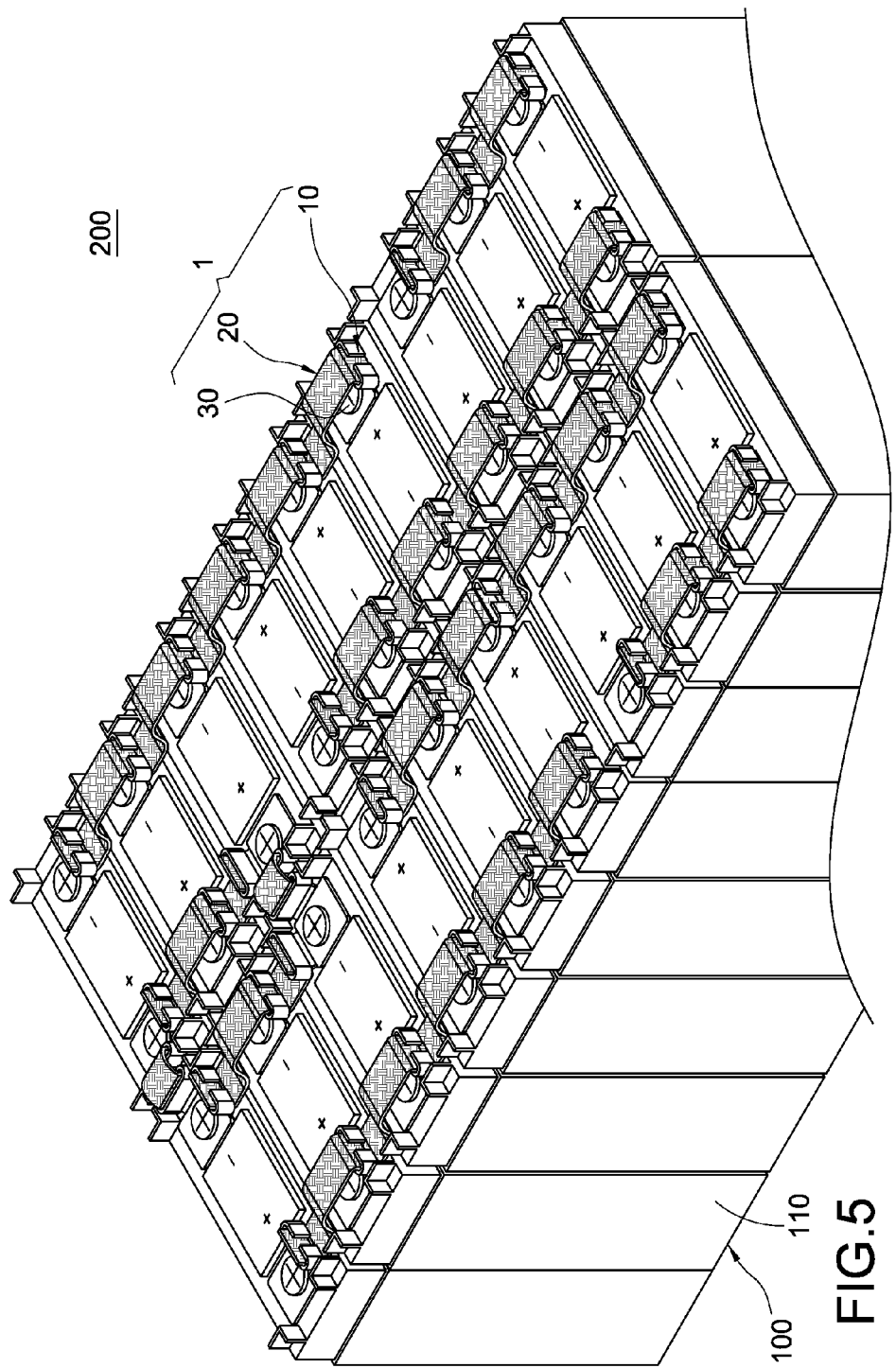
FIG. 5 is an assembled perspective view showing a battery set of the present invention constituted of two rows of battery units.

Please refer to FIG. 5, which shows a battery set 200 constituted of two rows of battery units 100. If the positive electrode and the negative electrode of each battery unit 100 are arranged as shown in this figure, there may be several feasible ways of connecting the flexible metallic woven bands 20. Thus, an operator may decide the number of battery units 100 connected in parallel, and use the flexible metallic woven bands 20 to serially connect the battery units 100 which are to be connected in parallel. Then, the operator cuts the flexible metallic woven bands at desired positions where connecting points are formed. In this way, the battery set 200 has a larger capacity or larger amount of current.

Figure 6:
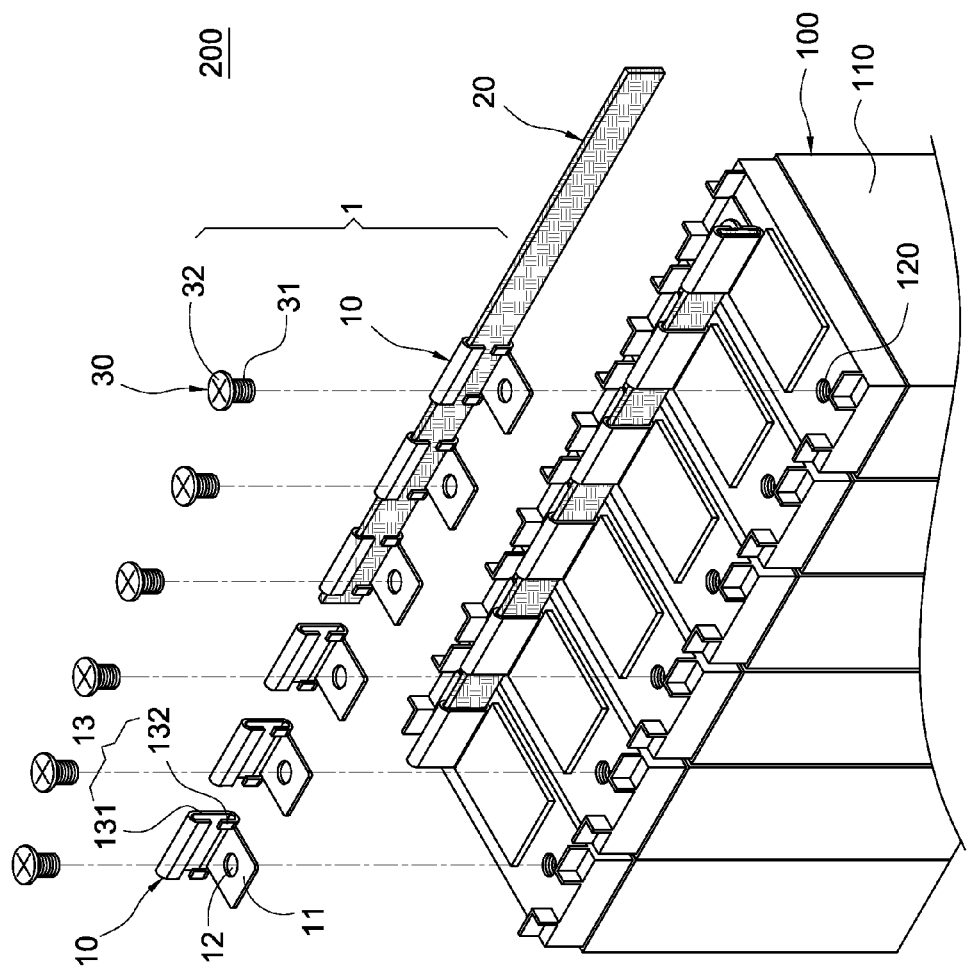
FIG. 6 is an exploded perspective view of one row of battery units according to another embodiment of the present invention.

FIG. 6 shows another embodiment of the present invention. The difference between the present embodiment shown in FIG. 6 and the previous embodiment shown in FIG. 1 is as follows. In the fixing portion 13 of each electrical-conductive connecting piece 10, a space between the stopping wall 131 and the pressing strips 132 is oriented to be parallel to a direction in which the flexible metallic woven band 20 is inserted through the fixing portion 13. Thus, the flexible metallic woven band 20 continuously connects the fixing portions 13 of the electrical-conductive connecting pieces 10 located on the positive electrode holes 120 to form a straight band instead of a waved (or curved) band shown in FIG. 1. Of course, the arrangement shown in FIG. 6 can still achieve the same effect as that of FIG. 1.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A parallel connection assembly of batteries, configured to connect a plurality of battery units in parallel to form a battery set, each of the battery units having a positive electrode hole and a negative electrode hole, the parallel connection assembly including:
   a plurality of electrical-conductive connecting pieces each having a through-hole and a fixing portion, the electrical-conductive connecting pieces being aligned with the positive electrode holes and the negative electrode holes respectively;
   two flexible metallic woven bands serially connecting the fixing portions of the electrical-conductive connecting pieces located on the positive electrode holes and the negative electrode holes respectively; and
   a plurality of electrical-conductive fixing elements passing through the through-holes to be fixed in the positive electrode holes and the negative electrode holes, so that the two flexible metallic woven bands can electrically connect the battery units in parallel,
   wherein each of the electrical-conductive connecting pieces is made of electrical-conductive metal and comprises a piece body, the through-hole and the fixing portion are formed on the piece body, the fixing portion comprises a stopping wall extending upwards from the piece body and two pressing strips bending from two opposite sides of the stopping wall, the flexible metallic woven band passes through a space between the stopping wall and the two pressing strips to be clamped by the two pressing strips.

2. The parallel connection assembly of batteries according to claim 1, wherein the flexible metallic woven band is made by weaving a plurality of copper wires into a web-like structure.

3. The parallel connection assembly of batteries according to claim 2, wherein each of the positive electrode hole and the negative electrode hole is an inner threaded hole made by electrical-conductive metal.

4. The parallel connection assembly of batteries according to claim 3, wherein each of the electrical-conductive fixing elements is made of electrical-conductive metal, and comprises an outer threaded portion threadedly engaged within the positive electrode hole or the negative electrode hole and a top plate connected to the outer threaded portion, the top plate has a larger diameter than that of the outer threaded portion for tightly pressing the piece body of the electrical-conductive metallic piece to achieve an electrical connection.

5. A battery set, including:
   a plurality of battery units each having a positive electrode hole and a negative electrode hole, and
   a parallel connection assembly, comprising:
   a plurality of electrical-conductive connecting pieces each having a through-hole and a fixing portion, the electrical-conductive connecting pieces being aligned with the positive electrode holes and the negative electrode holes respectively;
   two flexible metallic woven bands serially connecting the fixing portions of the electrical-conductive connecting pieces located on the positive electrode holes and the negative electrode holes respectively; and
   a plurality of electrical-conductive fixing elements passing through the through-holes to be fixed in the positive electrode holes and the negative electrode holes, so that the two flexible metallic woven bands can electrically connect the battery units in parallel,
   wherein each of the battery units includes a casing, the positive electrode hole and the negative electrode hole are provided on a top surface of the casing, each of the positive electrode hole and the negative electrode hole is an inner threaded hole made of electrical-conductive metal, the through-hole of each electrical-conductive connecting piece is disposed on the top surface of the casing of the battery unit to be aligned with the positive electrode hole or the negative electrode hole, and
   wherein each of the electrical-conductive connecting pieces is made of electrical-conductive metal and comprises a piece body, the through-hole and the fixing portion are formed on the piece body, the fixing portion comprises a stopping wall extending upwards from the piece body and two pressing strips bending from two opposite sides of the stopping wall, the flexible metallic woven band passes through a space between the stopping wall and the two pressing strips to be clamped by the two pressing strips.

6. The battery set according to claim 5, wherein the flexible metallic woven band is made by weaving a plurality of copper wires into a web-like structure.

7. The battery set according to claim 6, wherein each of the electrical-conductive fixing elements is made of electrical-conductive metal, and comprises an outer threaded portion threadedly engaged within the positive electrode hole or the negative electrode hole and a top plate connected to the outer threaded portion, the top plate has a larger diameter than that of the outer threaded portion for tightly pressing the piece body of the electrical-conductive metallic piece to achieve an electrical connection.

* * * * *